(12) United States Patent
Emmert

(10) Patent No.: US 10,724,885 B2
(45) Date of Patent: Jul. 28, 2020

(54) DISPENSING DEVICE AND SYSTEM FOR SOLID CHEMICAL CLEANING AGENTS

(71) Applicant: Ecolab USA Inc., Saint Paul, MN (US)

(72) Inventor: Justin Denton Emmert, Martinsville, VA (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 15/240,345

(22) Filed: Aug. 18, 2016

(65) Prior Publication Data

US 2017/0052051 A1 Feb. 23, 2017

Related U.S. Application Data

(60) Provisional application No. 62/206,390, filed on Aug. 18, 2015.

(51) Int. Cl.
*G01F 11/46* (2006.01)
*G01F 11/40* (2006.01)
(Continued)

(52) U.S. Cl.
CPC ............ *G01F 11/46* (2013.01); *D06F 39/026* (2013.01); *G01F 11/40* (2013.01); *A47K 5/1201* (2013.01)

(58) Field of Classification Search
CPC .......... G01F 11/38; G01F 11/40; G01F 11/46; G01F 11/44; D06F 1/00; A47K 5/1201
(Continued)

(56) References Cited

U.S. PATENT DOCUMENTS 534,082 A * 2/1895 Reeder ................. G01F 11/282
119/52.1
1,724,751 A 8/1929 Cushing
(Continued)

FOREIGN PATENT DOCUMENTS

CN 103917302 A 7/2014
DE 3438677 A1 4/1986
(Continued)

OTHER PUBLICATIONS

Ecolab USA Inc., PCT/US2016/047502 filed Aug. 18, 2016, "International Search Report and The Written Opinion of the International Searching Authority" dated Dec. 1, 2016, 11 pages.
(Continued)

*Primary Examiner* — Donnell A Long
(74) *Attorney, Agent, or Firm* — McKee, Voorhees & Sease, PLC

(57) ABSTRACT

An improved system and device for dispensing a cleaning agent is provided. The system can include a dispenser and a removable chemical container having the cleaning agent. The dispenser can include a storage portion, a dispensing portion, and a metering chamber associated with the dispensing portion. The metering chamber can be configured to receive a metered amount of the cleaning agent from the storage portion and dispense the metered amount to an outlet associated with a channel. The metering chamber can be removable and/or selectively interchangeable with another metering chamber configured to dispense a different metered amount. A dispenser includes an inlet gate and an outlet gate adapted to be selectively opened and closed to permit the cleaning agent to enter and exit the metering chamber. The inlet gate can open simultaneously as the outlet gate closes. The device can be hand-held.

19 Claims, 7 Drawing Sheets

(51) Int. Cl.
*D06F 39/02* (2006.01)
*A47K 5/12* (2006.01)

(58) Field of Classification Search
USPC .................................. 222/424.5–457, 325
See application file for complete search history.

(56) References Cited

U.S. PATENT DOCUMENTS

| | | | |
|---|---|---|---|
| 3,204,833 A | | 9/1965 | Weitzner |
| 3,850,347 A | | 11/1974 | Hill |
| 4,079,860 A | | 3/1978 | Maves |
| 4,708,265 A | * | 11/1987 | Bopst, III ............... G01F 11/10 222/284 |
| RE33,083 E | | 10/1989 | Pellegrino |
| 5,746,355 A | * | 5/1998 | Wold ..................... A47G 19/34 222/189.02 |
| 5,758,803 A | * | 6/1998 | Liao ........................ G01F 11/38 222/185.1 |
| 6,244,470 B1 | | 6/2001 | Harley-Wilmot |
| 8,439,231 B2 | | 5/2013 | Schroedter |
| 2003/0213820 A1 | | 11/2003 | Sherk, Jr. et al. |
| 2005/0029286 A1 | | 2/2005 | Bergin et al. |
| 2008/0099509 A1 | * | 5/2008 | Mountjoy ............... A47J 47/01 222/158 |
| 2011/0256273 A1 | * | 10/2011 | de Graaff ............... A47J 31/42 426/112 |
| 2012/0267401 A1 | * | 10/2012 | Schroedter ............... B65B 1/36 222/368 |
| 2013/0062347 A1 | * | 3/2013 | Webster ................. G01F 11/46 220/253 |
| 2014/0224841 A1 | | 8/2014 | Auerbach et al. |
| 2016/0298993 A1 | * | 10/2016 | Bernard .................. G01F 11/40 |

FOREIGN PATENT DOCUMENTS

| | | |
|---|---|---|
| JP | 52033360 U | 3/1977 |
| JP | 53037554 U | 4/1978 |
| JP | 53105764 U | 8/1978 |
| JP | 3061959 U | 9/1999 |
| JP | 3091094 U | 10/2002 |
| JP | 2012502728 A | 2/2012 |
| JP | 201491522 A | 5/2014 |
| KR | 101179698 B1 | 9/2012 |
| WO | 2010033023 A2 | 3/2010 |

OTHER PUBLICATIONS

"Industrial Cleaning Products", http://web.archive.org/web/20150228175353/http:/www.auspackaging.com.au/packaging, accessed by Applicant Dec. 28, 2018.

Toyo Seikan Co., Ltd., partial English translation of Publication No. S53-042661, published Apr. 12, 1978.

* cited by examiner

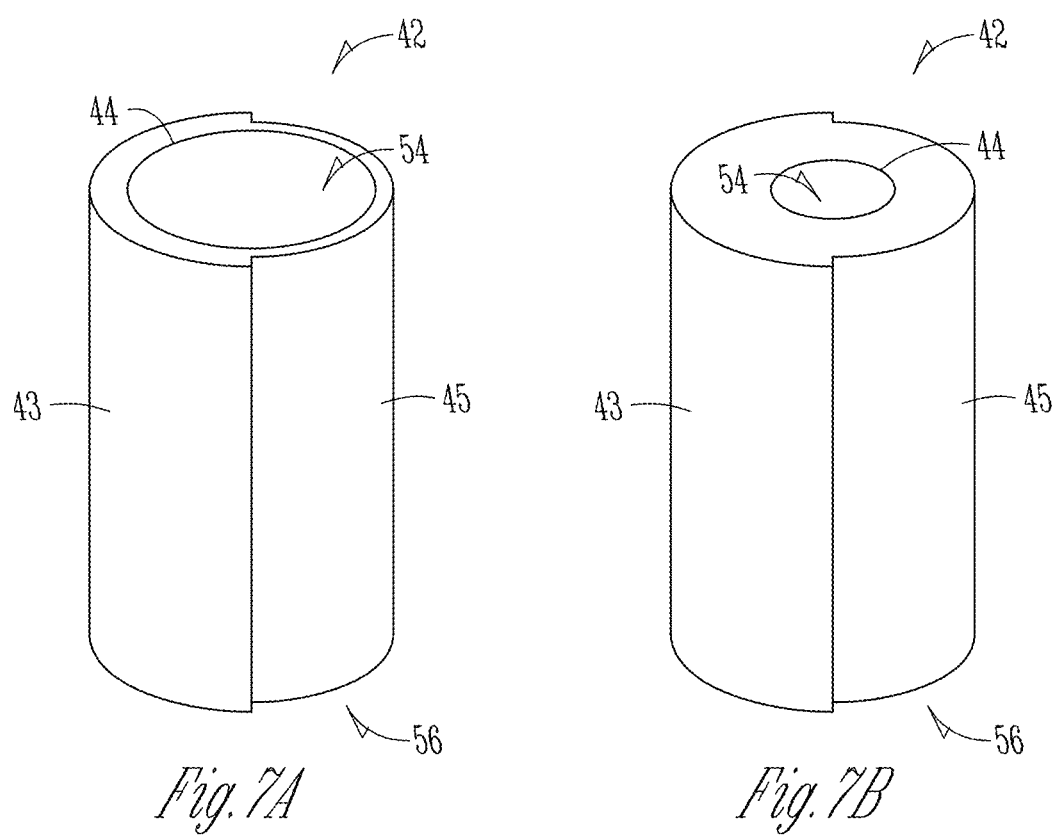

DISPENSING DEVICE AND SYSTEM FOR SOLID CHEMICAL CLEANING AGENTS

CROSS-REFERENCE TO RELATED APPLICATIONS

This application claims priority under 35 U.S.C. § 119 to Provisional Application Ser. No. 62/206,390, filed on Aug. 18, 2015, the contents of which are hereby incorporated by reference in their entirety.

FIELD OF THE DISCLOSURE

The present disclosure relates generally to dispensing a chemical agent in a cleaning application. More particularly, but not exclusively, the present disclosure relates to a system, device and method for dispensing powder, granular, and other solid chemistries in cleaning processes requiring sanitizers and/or other cleaning products.

BACKGROUND OF THE DISCLOSURE

In many modern industrial cleaning processes, specialized chemical products are utilized to improve cleaning efficiency. For example, dishwashing or ware washing systems require detergents, sanitizers, and/or other chemicals. For another example, a classic mop bucket typically contains a solution of water and a chemical cleaning product. Often, it is desirable to meter the chemical products in controlled amounts to the solution. In some instances, the chemical products are pumped from a dispenser via a tube or otherwise transferred from a container into the machine. In other instances, a hand-held dispenser is used for portability. The chemical products can be comprised of powders, granulates, or pre-formed solids such as tablets.

In applications using a hand-held dispenser, current technologies are limited to producing controlled dilutions; the dispensers do not meter a controlled amount of the cleaning product itself. Specifically, commonly known hand-held devices operably connect to both a water source and a reservoir of liquid chemicals. The device mixes the water with the liquid chemical(s) as the water passes through the device. While a controlled dilution is provided, the amount of the cleaning agent dispensed is based, at least in part, on the amount of water passed through the device. However, a need exists in the art for a hand-held device that is capable of metering a controlled amount of cleaning agent independent of the water (or liquid carrier) dispensed. A further need exists for a hand-held device that dispenses the cleaning agent without fluid connection to a water, liquid reservoir, or other liquid source.

Different cleaning applications often require different metered amounts of cleaning agents. Therefore, a need exists in the art for a device that can dispense different metered amounts of cleaning agents with minimal effort by a user.

Furthermore, the typical hand-held devices are generally limited to dispensing liquid chemical products. Many cleaning chemistries, however, are better suited in powder, granule, or pre-formed tablet forms. For example, chlorine chemistries are better suited in a solid, pre-formed tablet to minimize exposure of the end user to the concentrated product and/or mitigate the need for personal protective equipment.

The powder, granule, or pre-formed tablet forms of chemistries may be separately contained, that is, provided in a container manufactured separately from the dispenser. The separate container for the chemical agents can improve manufacturing efficiency and reuse of the dispenser. Therefore, a need exists in the art for a reusable dispenser configured to operably connect to containers having cleaning chemistries.

SUMMARY

It is therefore a primary object, feature, and/or advantage of the present disclosure to improve on or overcome the deficiencies in the art.

It is another object, feature, and/or advantage of the present disclosure to provide a dispensing system capable of metering a controlled amount of cleaning agent independent of the water (or liquid carrier) dispensed.

It is yet another object, feature, and/or advantage of the present disclosure to provide a hand-held device that dispenses the cleaning agent without fluid connection to a water, liquid reservoir, or other liquid source.

It is still another object, feature, and/or advantage of the present disclosure to dispense different metered amounts of cleaning agents with minimal effort by a user.

It is still yet another object, feature, and/or advantage of the present disclosure to provide a reusable dispenser configured to operably connect to containers having cleaning chemistries.

These and/or other objects, features, and advantages of the present disclosure will be apparent to those skilled in the art. The present disclosure is not to be limited to or by these objects, features and advantages. No single embodiment need provide each and every object, feature, or advantage.

According to an aspect of the disclosure, a system for dispensing a cleaning agent is provided. The system includes a hand-held dispenser and a removable chemical container having the cleaning agent. The hand-held dispenser includes a storage portion configured to receive at least a portion of the cleaning agent from the removable chemical container, an elongated dispensing portion having a channel in selective operable connection with the storage portion, an outlet positioned at a terminal end of the channel. The hand-held dispenser can further include a metering chamber associated with the elongated dispensing portion. The metering chamber can be configured to receive a fixed metered amount of the cleaning agent from the storage portion and dispense the fixed metered amount to the channel. The metering chamber can be removable and/or selectively interchangeable with another metering chamber configured to meter a different metered amount of the cleaning agent.

According to another aspect of the disclosure, a device for dispensing a cleaning agent includes a storage portion having an inlet larger than an outlet. A dispensing portion is in operable communication with the outlet of the storage portion. The device further includes a measuring chamber associated with the dispensing portion. The measuring chamber has an inlet and an outlet. An inlet gate is disposed between the outlet of the storage portion and the inlet of the measuring chamber, and an outlet gate is disposed proximate to the outlet of the measuring chamber. The inlet gate and the outlet gate are adapted to be selectively opened and closed. The measuring chamber can be adapted to be selectively attached and detached from the dispensing portion.

The device can further include an inner mechanism configured to selectively open or close the inlet gate and/or the outlet gate, and/or an external mechanism in operable connection with the inner mechanism. The external mechanism can receive an input from a user. The inlet gate can open simultaneously as the outlet gate closes.

According to yet another aspect of the disclosure, a method for dispensing a chemical agent is comprising the step of loading the chemical agent into a storage portion of a dispensing device. The storage portion funnels the chemical agent towards an inlet gate. A mechanism is activated to open an outlet gate and close the inlet gate. A metered amount of the chemical agent is transferred into a measurement chamber when the inlet gate is open and the outlet gate is closed. The mechanism is deactivated to close the outlet gate and open the inlet gate. The chemical product is dispensed from the dispensing device when the outlet gate is open and the inlet gate is closed.

The method can further include the step of selectively interchanging the measurement chamber for a second measurement chamber configured to meter a different metered amount of the chemical agent. The step of loading the chemical agent into the storage portion can further comprise attaching a removable chemical container containing the chemical agent. The dispensing device can be hand-held.

BRIEF DESCRIPTION OF THE DRAWINGS

Illustrated embodiments of the disclosure are described in detail below with reference to the attached drawing figures, which are incorporated by reference herein, and where:

FIG. 7A is a perspective view of a meter chamber in accordance with an illustrative embodiment; and FIG. 7B is a perspective view of a meter chamber in accordance with an illustrative embodiment.

DETAILED DESCRIPTION

Figures 1A, 1B:
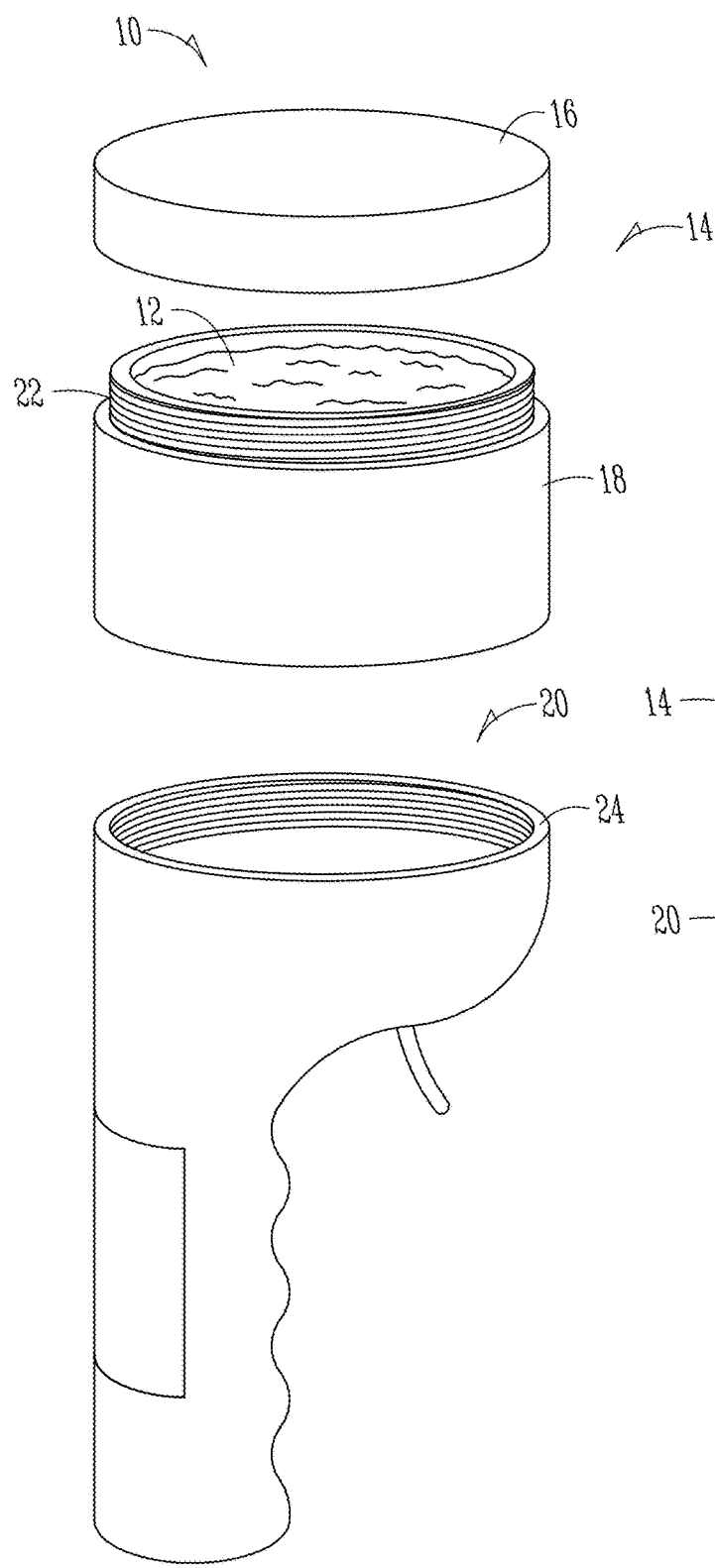
FIG. 1A is an exploded view of a dispensing system in accordance with an illustrative embodiment.
FIG. 1B is a front perspective view of a dispensing system in accordance with an illustrative embodiment.

FIG. 1A illustrates an exemplary dispensing system 10 for dispensing a cleaning agent 12 or chemical agent. The system 10 is advantageously designed to minimize user exposure to the cleaning agent 12. To do so, the system 10 can include a removable chemical container 14 containing the cleaning agent 12. The chemical container 14 can contain a lid 16 removably connected to a base 18. The lid 16 and the base 18 can be threadably connected, as shown illustratively in FIG. 1A, or through any other means commonly known in the art. When the lid 16 is removed from the base 18, the base 18 can include a film (not shown) to preserve the potency (i.e., prevent spoliation of any active ingredients) of the cleaning agent 12 contained therein. The chemical container 14 can contain solid chemistries in powder, granule or tablet form. The solid chemistries can include chlorine, but the present disclosure contemplates other commonly used cleaning chemicals such as ammonia, sodium carbonate, sodium hydroxide, and alkalis, and other cleaning products such as detergents, sanitizers, solvents, degreasers, and the like. In another exemplary embodiment, the dispensing system 10 uses liquid chemistries consistent with the objects of the present disclosure discussed herein.

The chemical container 14 is configured to operatively connect to a dispenser 20. In the illustrative embodiment of FIGS. 1A and 1B, threads 22 associated with the base 18 of the chemical container 14 are configured to connect with counterposing threads 24 associated with the dispenser 20. Other connective means are envisioned, including interlocking tabs 25 (FIG. 2), detent pins, clamps, interference fit, and the like. To install the chemical container 14 on the dispenser, the lid 16 (and film) is removed from the base 18.

The dispenser 20 is inverted, after which the threads 22, 24 are threadably engaged to secure the chemical container 14 to the dispenser 20. The installation results in the exemplary system 10 illustrated in FIG. 1B, which sealably contains the chemical agent 12 within the chemical container 14 and dispenser 20 and prevents any user exposure to the cleaning agent 12.

In another exemplary embodiment, the cleaning agent 12 can be poured or otherwise transferred to the dispenser 20. Such a situation may arise when a facility has large bulk containers with the chemical agent, as opposed to a chemical container 14 sized and shaped to mate with the dispenser 20. The transferring of the cleaning agent 12 through pouring, scooping, or other similar means can increase the likelihood of user exposure to the cleaning agent 12, but the dispenser 20 advantageously increase portability and safety thereafter. After the chemical agent 12 is transferred to the dispenser, a lid can be secured to the threads 24 or other connective means on the dispenser 20. The lid could be the same lid 16 configured to be operatively connected to the chemical container 14. In still another exemplary embodiment, the dispenser 20 can be manufactured and/or distributed as pre-filled with the cleaning agent 12.

It is further contemplated that packaging, such as a bulk packaging of a product to be metered and/or dispensed by the dispenser 20 disclosed herein could be integrated to reduce the possibility of contact with the product, such as the agent 12. For example, a portion of the dispenser could be connected to the bulk packaging, and the dispenser 20 opens the packaging to allow the agent 12 to be filled. As product is metered and dispensed by the dispenser 20, the product will continue to be added to the dispenser 20 until the bulk packaging is emptied. This would further protect a handler, such as by mitigating the need to physically load the dispenser with the agent 12.

Figure 2:
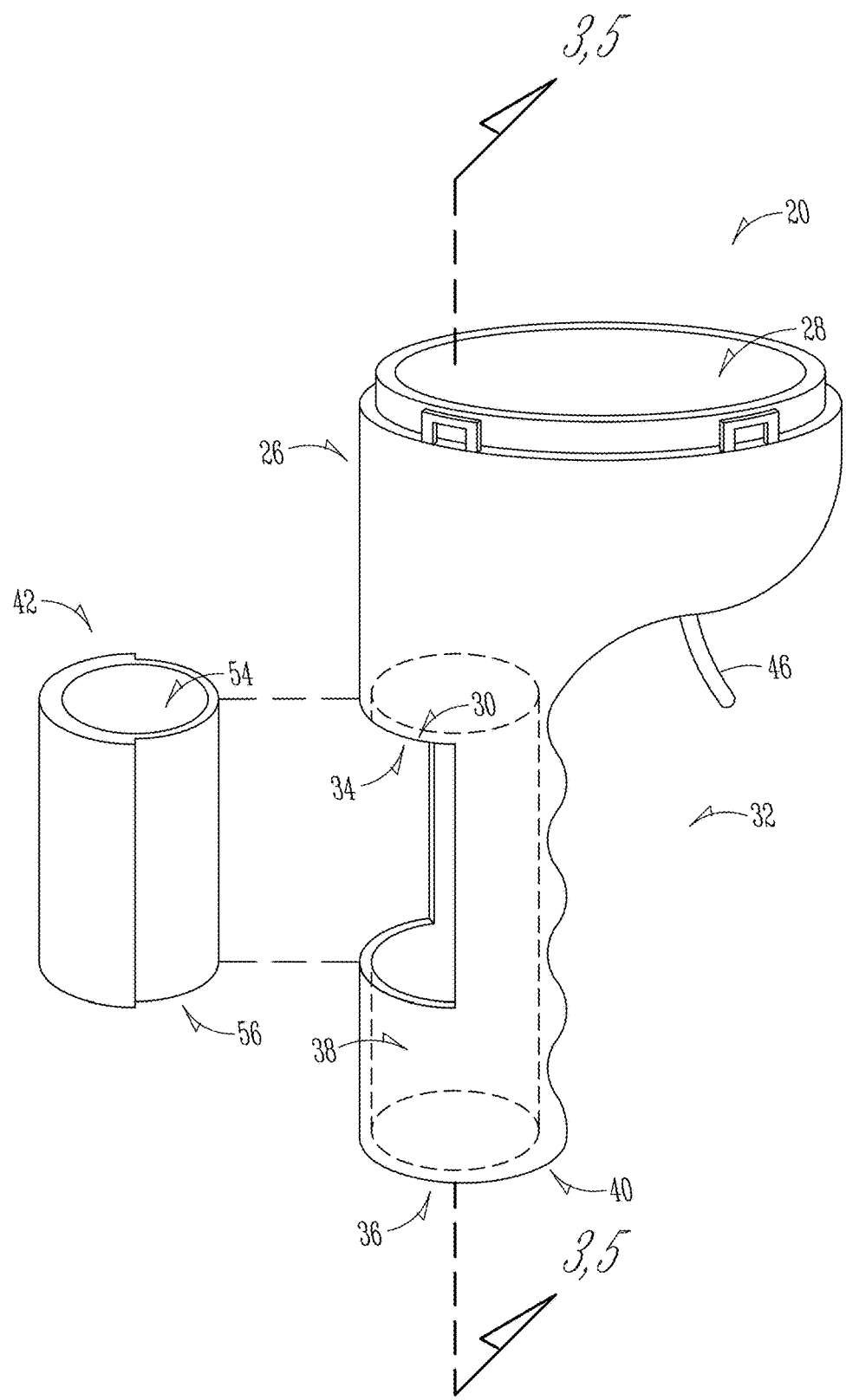
FIG. 2 is a partially exploded view of a dispensing system in accordance with an illustrative embodiment.

Referring to FIG. 2, an exemplary dispenser 20 is illustrated. The dispenser can include a storage portion 26 configured to receive at least a portion of the chemical agent 12 from the chemical container 14. The shape of the storage portion 26 is tapered and/or otherwise configured to funnel the chemical agent 12 from an inlet 28 of the storage portion 26 to an outlet 30 of the storage portion 26. The inlet 28 is generally proximate to the threads or other connective means. In the illustrated embodiment of FIG. 2, the storage portion 26 is shaped as a partial hemispheroid with an elongated dispensing portion 32 extending therefrom. The present disclosure contemplates any number of tapering shapes without deviating from the objects of the present disclosure. For example, the storage portion 26 can be a hemispheroid with the dispensing portion 32 extending from a center (i.e., the storage portion 26 and the dispensing portion 32 are axially aligned when viewed from above).

Figure 6A:
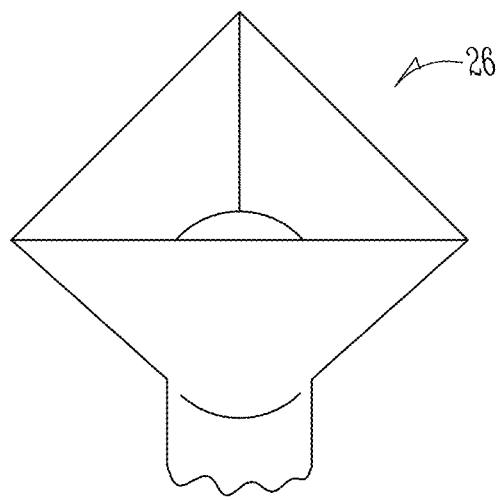
FIG. 6A is a perspective view of a storage portion of a dispenser in accordance with an illustrative embodiment.
Figure 6B:
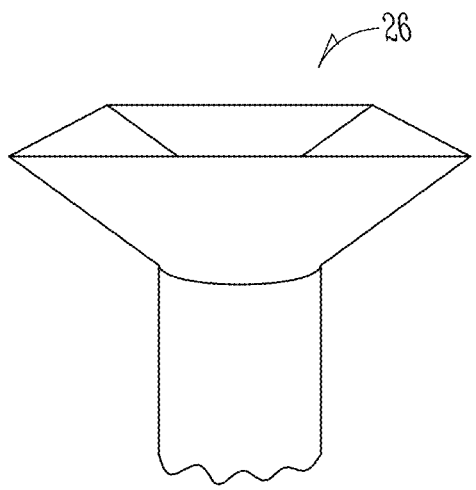
FIG. 6B is a perspective view of a storage portion of a dispenser in accordance with an illustrative embodiment.
Figure 6C:
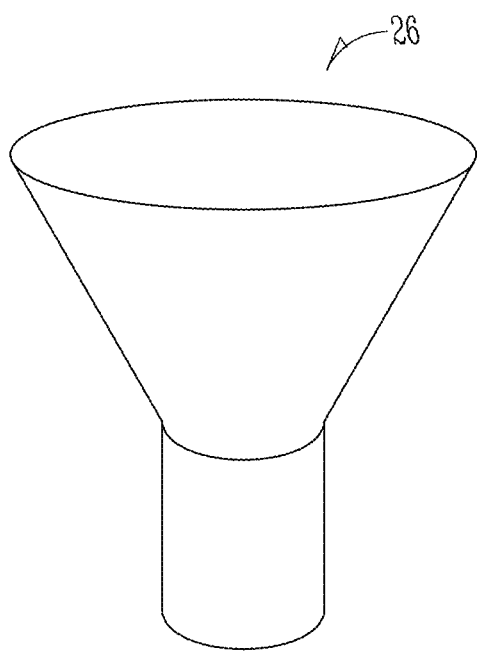
FIG. 6C is a perspective view of a storage portion of a dispenser in accordance with an illustrative embodiment.

The storage portion 26 can be pyramidal, frustro-pyramidal, conical, or a frustum of a cone, as illustrated generally in FIGS. 6A-6C.

The elongated dispensing portion 32 has an inlet 34 and an outlet 36. The inlet 34 of the dispensing portion 32 is generally associated and in operable communication with the outlet 30 of the storage portion 26. A channel 38 connects the inlet 34 and the outlet 36 of the dispensing portion 32. The outlet 36 is positioned at a terminal end 40 of the channel 38 and/or the dispensing portion 32. The channel 38 can be generally oriented vertically so the chemical agent 12 travels therethrough by the force of gravity. The channel 38 can be in selective operable communication with the storage portion 26, which will be discussed herein.

As illustrated in FIGS. 1A, 1B and 2, the dispensing portion 32 can be generally in the shape of a handle and/or otherwise sized and/or shaped to comfortably be used as a hand-held device. As a result, the dispensing system 10 and dispenser 20, as illustrated in FIGS. 1B and 2, respectively, improve portability of cleaning agents 12 and modularity of cleaning operations.

The dispenser 20, and more particularly the dispensing portion 32, can include a metering chamber 42 (or measuring chamber). The metering chamber 42 is configured to receive a metered amount of the cleaning agent 12 from the storage portion 26. As illustrated in FIG. 2, the metering chamber 42 can generally be cylindrical and sized to be selectively inserted and/or removed (or attached and/or detached) from the dispensing portion 32 of the dispenser 20. As illustrated in FIGS. 2, 7A and 7B, the metering chamber 42 can have a raised portion 43 extending outwardly from an outer surface 45. The raised portion 43 can be adapted to securely mate with the dispensing portion 32 of the dispenser. The means for securely connecting the metering chamber 42 with the dispensing portion 32 can include but are not limited to detent pins, locking tabs, snap fit and/or interference fit. The metering chamber 42 can be constructed of clear material, preferably a plastic or other similar polymer, to permit a user to view the level of the cleaning agent 12 contained therein.

As mentioned, cleaning operations often require precise amounts of chemical cleaning agents. The metering chamber 42 is configured to receive and/or dispense a fixed metered amount of the cleaning agent 12 to ensure consistent dispensing of amounts of cleaning agents. As different cleaning operations may require different amounts of chemical cleaning and/or other chemical agents, the metering chamber 42 can be removable and replaced with a different metering chamber capable of holding a different fixed amount of chemical agent. In other words, a user can select one of several selectively interchangeable metering chambers 42 based on the needs of the application. It is also contemplated that the metering chambers 42 be variable to allow for changing on the go of the amounts of a product to be metered and dispensed. The metering chambers 42 are configured to be easily detached and reattached to increase the efficiency and modularity of the dispensing system 10. In an exemplary embodiment, the different metering chamber, if in cylindrical form, can have a larger or smaller inner circumference 44 to store a greater or lesser amount of cleaning agent 12, as shown illustratively in FIGS. 7A and 7B.

In operation, the metering chamber 42 is configured to receive at least a portion of the chemical agent 12 through the outlet 30 of the storage portion 26 and the inlet 34 of the dispensing portion 32. The metering chamber 42 can comprise a portion of the channel 38. The metering chamber 42 is also configured to release the chemical agent 12 to the channel 38 to be discharged through the outlet 36 of the dispenser 20.

To do so, an external mechanism 46 is operably connected to the dispenser 20. In the illustrative embodiment of FIG. 2, the external mechanism 46 is a trigger connected to the storage portion 26. The present disclosure contemplates alternative external mechanisms, such as activation members including but not limited to, push buttons, twistable knobs, pull levers, and the like. The external mechanism 46 can be user-operated. More specifically, the user-operated external mechanism 46 is configured to receive a user input (e.g., pulling the trigger, pushing the button, twisting the knob) to selectively connect the storage portion 26 and the channel 38 of the dispensing portion 32, and thereby permit cleaning agent 12 to pass through the outlet 30 of the storage portion 26 and the inlet 34 of the dispensing portion 32 (and into the metering chamber (42)). A user can provide an input sufficient to load the metering chamber 42 with the full fixed metered amount, or alternatively provide an input to dispense a lesser metered amount of the chemical agent 12. In other words, the metered amount transferred to the metering chamber 42 can be based, at least in part, on the user input applied to the external mechanism 46.

Figure 3:
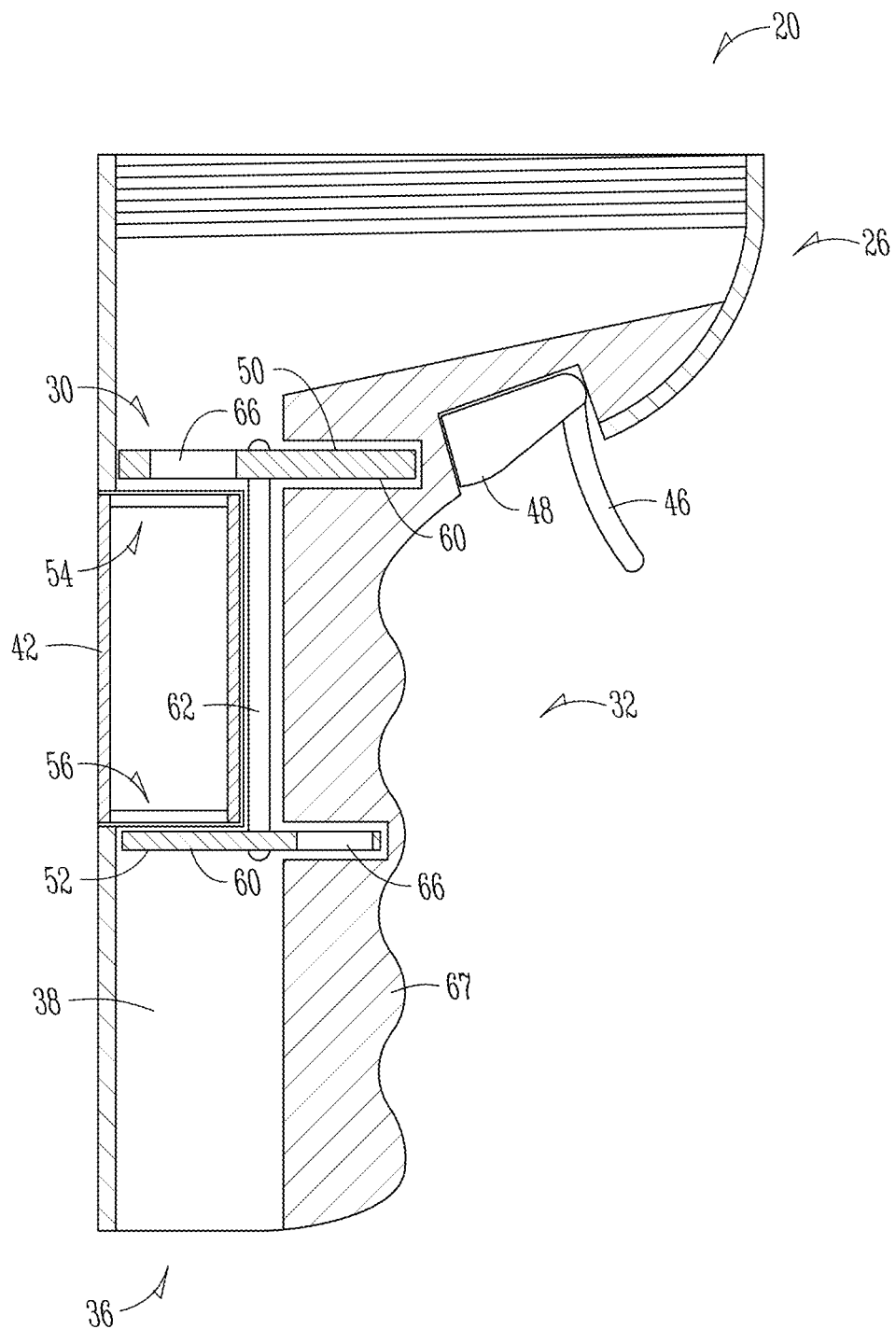
FIG. 3 is a cross-sectional view of the dispensing system of FIG. 2 taken across section line 3-3.

Referring to FIG. 3, the external mechanism 46 actuates an inner mechanism 48. The inner mechanism 48 is configured to transfer the user input to the external mechanism 46 to drive the internal components of the dispenser 20. More particularly, the inner mechanism 48 is configured to selectively connect the storage portion 26, the metering chamber 42 and/or the channel 38 so as to permit the cleaning agent 12 to move through the dispenser 20. Exemplary inner mechanisms 48 can include lever arms, ratchet and pawl, gears, belts, and the like. In another exemplary embodiment, the inner mechanism 48 (and/or the external mechanism 46) can be controlled remotely by an electronic controller (not shown). The configuration is particularly suitable when the dispensing system 10 is not hand-held. In such an embodiment, the inner mechanism 48 can be an electric motor, an electromagnetic solenoid, and the like, so as to selectively connect the storage portion 26, the metering chamber 42 and/or the channel 38.

Figure 5:
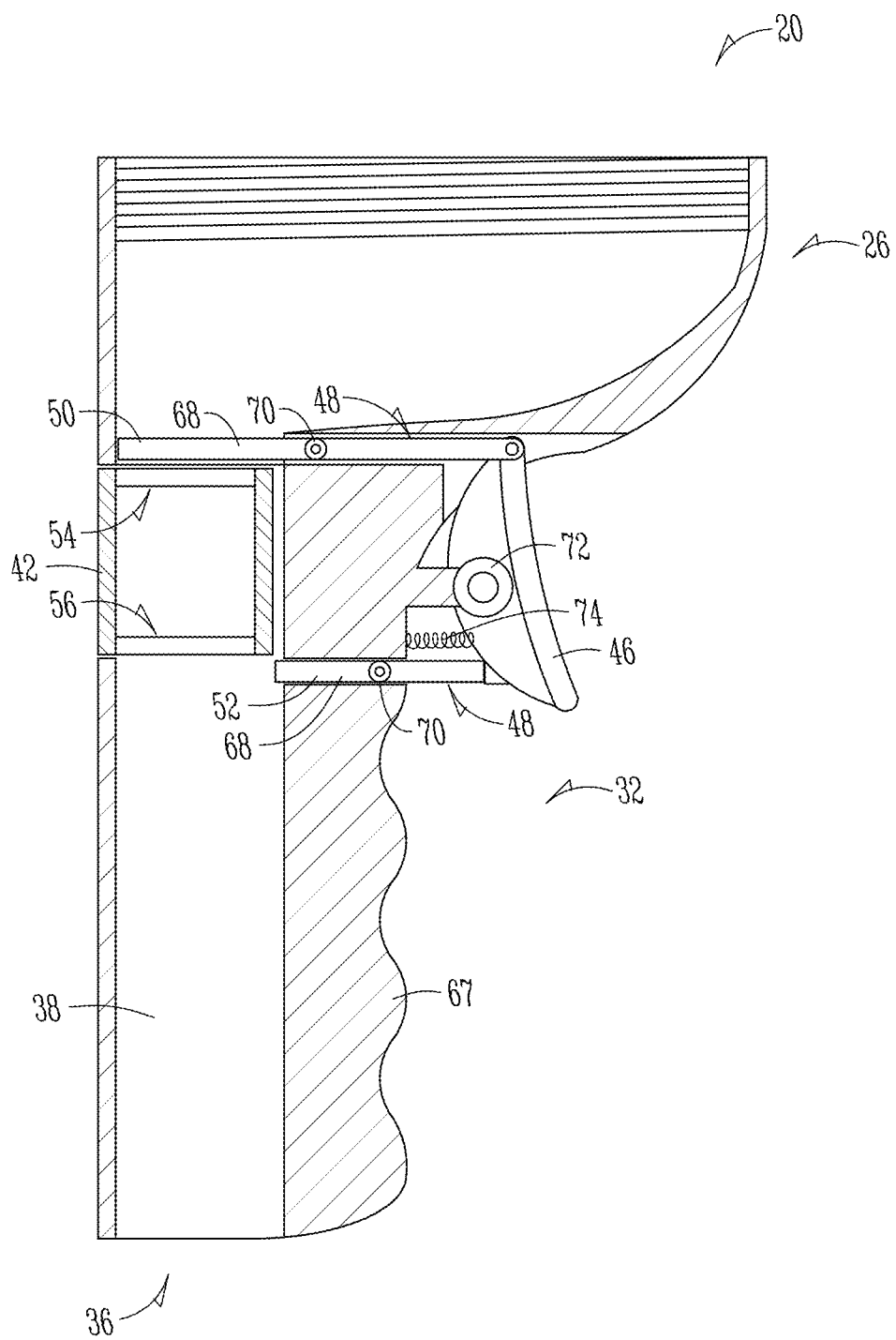
FIG. 5 is a cross-sectional view of the dispensing system of FIG. 2 taken across section line 5-5.

More specifically, the internal mechanism 48 is configured to selectively open and close an inlet gate 50 and an outlet gate 52 associated with the dispensing portion 32. Referring to FIGS. 3 and 5, the inlet gate 50 is disposed between the outlet 30 of the storage portion and an inlet 54 of the measuring chamber 42. In another exemplary embodiment, the inlet gate 50 can be disposed within the channel 38 between the inlet 36 of the dispensing portion 32 and the inlet 54 of the measuring chamber 42. The present disclosure contemplates any location of the inlet gate 50 relative to the outlet 30 of the storage portion, inlet 36 of the dispensing portion 32, and/or and an inlet 54 of the measuring chamber 42 provided the inlet gate 50 selectively regulate the transfer of the cleaning agent 12 into the measuring chamber 42. Similarly, the outlet gate 52 is disposed proximate to an outlet 56 of the measuring chamber 42. The outlet gate 52 can be positioned within or proximate to the channel 38 and configured to regulate the transfer of the cleaning agent 12 from the measuring chamber 42 to the outlet 36 of the dispenser 20.

In the illustrated exemplary embodiment of FIGS. 3 and 5, the inlet gate 50 can be a plate-like structure when viewed from the side. The inlet gate 50 and/or the outlet gate 54 can include a rotating disc, a sliding gate, and/or a trap door.

Figure 4:
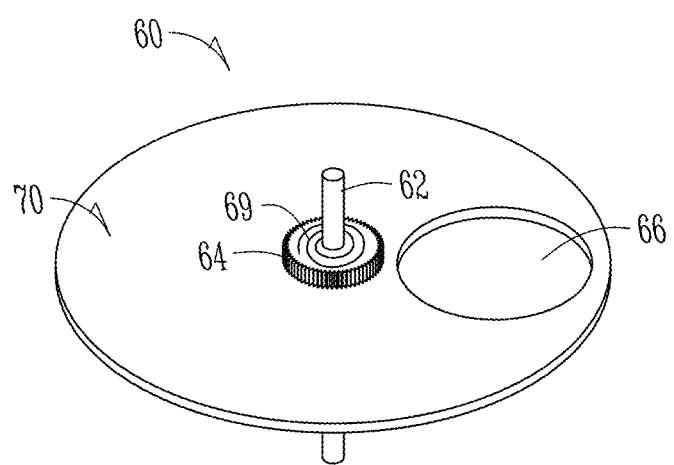
FIG. 4 is a perspective view of a rotating disc inlet gate or outlet gate in accordance with an illustrative embodiment.

An exemplary embodiment of an inlet gate 50 and/or outlet gate 52 using a rotating disc 60 is illustrated in FIGS. 3 and 4. The disc 60 can be generally flat and connected an axle 62 extending through a center of the disc 60. A drive gear 64 can be connected to the axle 62 and/or the disc 60. The drive gear 64 is configured to operably connect to the inner mechanism 48. While a drive gear 64 is illustrated in FIG. 4, the present disclosure other means for rotating the disc 60 upon a user input, including but not limited to, ratchet and pawl and other types gearing. In embodiment using an electronic controller, the disc 60 can be rotated using an electric motor.

An opening 66 such as a hole is eccentrically positioned within the disc 60. The opening 66 of each of the inlet gate 50 and outlet gate 52 is configured to permit the cleaning agent 12 to enter and exit the metering chamber 42, respectively. In an open position, the opening 66 is axially aligned with the channel 38, and the inlet 54 and the outlet 56 of the metering chamber 42. In a closed position, the opening 66 is generally rotated by one-hundred eighty degrees, whereby the opening 66 is within a handle portion 67 of the elongated dispensing portion 32. In the closed position, a barrier portion 70 of the disc 60, as illustrated in FIG. 4, prevents the cleaning agent 12 from passing either to or from the metering chamber 42. In the configuration illustrated in FIG. 3, the inlet gate 50 is in an open position and the outlet gate 52 is in a closed position.

In an exemplary embodiment, the configuration illustrated in FIG. 3 can be the default configuration. The cleaning agent 12 enters the metering chamber 42 until the metering chamber 42 is full, but the cleaning agent 12 is not discharged. When a user wishes to dispense the fixed metered amount from the metering chamber 42, the user engages the external mechanism 46 (e.g., pulls the trigger). The external mechanism 46 actuates the inner mechanism 48, which drives the drive gear 64 operably connected to the axle 62 and/or disc 60. The inlet gate 50 rotates from an open position to a closed position, thereby preventing further cleaning agent from entering the metering chamber 42. The closing gate 60 can simultaneously rotate from a closed position to an open position to permit the fixed metered amount to be discharged through the remainder of the channel 38 and the outlet 36 of the dispenser. In an exemplary embodiment, the axle 62 associated with a lower surface of the inlet gate 50 is also associated with the upper surface of the outlet gate 52, as illustrated in FIG. 3. Thus, a single user input can actuate the inlet gate 50 and the outlet gate 52.

At least one torsion spring 69 can be operably connected to the disc 60 of the inlet gate 50 and/or the disc 60 of the outlet gate 52. In an open position, the torsion spring 69 can be in an uncompressed state. Upon a user input to the external mechanism 46 with rotation of the disc(s) 60, the torsion spring 69 compresses such that when the user releases the external mechanism 46, the inlet gate 50 and the outlet gate 52 return to a default position.

In another exemplary embodiment, the default configuration comprises the inlet gate 50 in a closed position and the outlet gate 52 in an open position. When a user wishes to dispense a metered amount from the metering chamber 42, the user engages the external mechanism 46. The external mechanism 46 actuates the inner mechanism 48, which drives the drive gear 64 operably connected to the axle 62 and/or disc 60. The inlet gate 50 rotates from a closed position to an open position, and the closing gate 60 can simultaneously rotates from an open position to a closed position. The operation is similar to the exemplary embodiment discussed above, but the reversing of the default positions permits a user to meter less than the fixed metering amount. Specifically, if the user desires to meter one-half the capacity of the metering chamber 42, the user could release the external mechanism 46 prior to the fixed metered amount of the cleaning agent 12 from entering the metering chamber 42. The torsion spring 69 releases, thereby simultaneously closing the inlet gate 50 and opening the outlet gate 52. The present disclosure contemplates that the default configuration can be selectively adjustable by the user prior to operating the dispenser 20.

An exemplary embodiment of an inlet gate 50 and/or outlet gate 52 using a sliding gate 68 is illustrated in FIG. 5. The sliding gate 68 can be a flat, plate-like structure when viewed from the side. The sliding gate 68 can be operably connected to the inner mechanism 48. In the illustrated embodiment of FIG. 5, the inner mechanism 48 is a plate-like structure connected to the sliding gate 68 with a hinge 70. The inner mechanism 48 are configured to provide a lateral force to the sliding gate 68 upon application and/or removal of a user input to the external mechanism 46. In an exemplary embodiment, the external mechanism 46 is pivotally connected to a pivot 72, and the inner mechanism 48 associated with the inlet gate 50 and the outlet gate 52 are connected to the external mechanism.

Similar to the exemplary embodiment illustrated in FIG. 3 and discussed above, the embodiment using sliding gates can have more than one default configuration. In the illustrated embodiment of FIG. 5, the sliding gate 68 of the inlet gate 50 is in a closed position; and the sliding gate 68 of the outlet gate 52 is in an open position. Upon application of a user input, the external mechanism 46 pivots about the pivot 72. A lateral force is applied to the move (i.e., "pull") the inlet gate 50 to an open position and simultaneously move (i.e., "push") the outlet gate 52 to a closed position. The cleaning agent 12 descends from the force of gravity to through the outlet 30 of the storage portion, the inlet 34 of the elongated dispensing portion 32, and the inlet 54 of the metering chamber 42. When a metered amount, or a fixed metered amount associated with the metering chamber 42, is contained with the metering chamber 42, the user can remove the user input. A resilient member 74 operably connected to the external mechanism 46 and to the handle portion 67 of the dispensing portion 32 forces the external mechanism 46 to return to the default configuration. The inlet gate 50 and the outlet gate 52 similarly return to their default positions. The present disclosure contemplates the resilient member 74 can be connected to the inner mechanism 48 or any other component so as to return the device to the default configuration without deviating from the objects of the present disclosure.

In another exemplary embodiment, the default configuration comprises the inlet gate 50 in an open position and the outlet gate 52 in a closed position. Similar to the illustrated exemplary embodiment of FIG. 3, the cleaning agent 12 enters the metering chamber 42 until the metering chamber 42 is full, but is not discharged. When a user wishes to dispense the fixed metered amount from the metering chamber 42, the user engages the external mechanism 46, which actuates the inner mechanism 48. The sliding gate 68 of the inlet gate 50 moves from an open position to a closed position, thereby preventing further cleaning agent from entering the metering chamber 42. The sliding gate 68 of the inlet gate 50 closing gate 60 simultaneously moves to closed position to an open position to permit the fixed metered amount to be discharged through the remainder of the channel 38 and the outlet 36 of the dispenser. The present disclosure contemplates that the default configuration can be selectively adjustable by the user prior to operating the dispenser 20.

In another exemplary embodiment, the inlet gate 50 and/or the outlet gate 52 can be a trap door that is actuated by a latch, spring and other mechanisms. Upon an input from a user to the external mechanism 46, a latch can disengage, thereby permitted the trap door to open. The cleaning agent 12 enters the metering chamber 42. Upon release of the user (or upon application of a second user input), a latch associated with a trap door associated with the outlet gate 52 disengages, thereby permitting the cleaning agent to exit from the dispenser 20. One or more springs can be operably connected to the inner mechanism(s) 48 and the trap doors so as to open and/or close the inlet gate and/or the outlet gate 52 with application and/or removal of the user input.

In still another exemplary embodiment, the external mechanism 46 can be a double-action trigger. The double-action trigger can be comprised of an inner mechanism 48 configured to separate associated two "trigger pulls" with two separate actions. Specifically, with a double-action trigger, a first trigger pull can open in the inlet gate 50 and close the outlet gate 52; and a second trigger pull can close the inlet gate 50 and open the outlet gate 52. Further, with a double-action trigger and increasingly complex external mechanisms 46 and internal mechanisms 48, default configurations can include both the inlet gate 50 and the outlet gate 52 in a closed position, wherein the inlet gate 50 or the outlet gate 52 are selectively and independently openable and/or closeable.

In still yet another exemplary embodiment, an electronic controller operably controls the inlet gate 50 and the outlet gate 52 via the inner mechanism(s) 48. The present disclosure contemplates any means commonly known in the art of doing so, particularly electronic switches and solenoids. The electronic controller and other electronic components can be powered by batteries (not shown) or other power source disposed within the handle portion 67 of the dispenser 20.

The disclosure is not to be limited to the particular embodiments described herein. In particular, the disclosure contemplates numerous variations in the type of ways in which embodiments of the disclosure can be applied to a system, device and method for dispensing powder, granular, and other solid chemistries in cleaning processes requiring sanitizers and/or other cleaning products. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all that is intended.

The previous detailed description is of a small number of embodiments for implementing the disclosure and is not intended to be limiting in scope. The following claims set forth a number of the embodiments of the disclosure with greater particularity.

What is claimed is:

1. A hand-held dispensing system for dispensing a cleaning agent, the system comprising:
   a dispenser comprising:
   (a) a cleaning agent;
   (b) a storage portion containing the cleaning agent;
   (c) an elongated dispensing portion having a vertically oriented handle portion and a vertically oriented channel in selective operable connection with the storage portion; and
   (d) a metering chamber having an outlet positioned at a terminal end of the channel and a raised portion extending perpendicularly outwardly from an outer surface of the metering chamber to securely mate with the elongated dispensing portion, wherein when the metering chamber securely mates with the elongated dispensing portion, the metering chamber has an outer surface flush with another outer surface of the elongated dispensing portion.

2. The system of claim 1 wherein the metering chamber is associated with the elongated dispensing portion, configured to receive a fixed metered amount of the cleaning agent from the storage portion, and configured to dispense the fixed metered amount to the channel.

3. The system of claim 2 wherein the metering chamber is removable.

4. The system of claim 2 further comprising:
   a user-operated mechanism configured to receive a user input and selectively connect the storage portion and the elongated dispensing portion; and
   wherein the selective operable connection permits the cleaning agent to transfer from the storage portion to the metering chamber.

5. The system of claim 1 wherein the dispenser dispenses a metered amount of the cleaning agent based, at least in part, on the user input.

6. The system of claim 5 wherein the metered amount is fixed.

7. The system of claim 1 wherein the cleaning agent comprises at least one of powder, granules, and pre-formed tablets.

8. The system of claim 1 wherein the storage portion is tapered from an inlet to an outlet and configured to funnel the cleaning agent proximate to the outlet.

9. A device for dispensing a cleaning agent, the device comprising:
   a packaging containing a cleaning agent;
   a storage portion configured to receive at least a portion of the cleaning agent and having an inlet and an outlet;
   a dispensing portion in operable communication with the outlet of the storage portion, the dispensing portion having a vertically oriented handle portion and a vertically oriented channel;
   a modular, interchangeable measuring chamber associated with the dispensing portion such that when the modular, interchangeable measuring chamber is secured to the dispensing portion, the modular, interchangeable measuring chamber has an outer surface flush with another outer surface of the dispensing portion, the measuring chamber having an inlet and an outlet;
   an inlet gate disposed between the outlet of the storage portion and the inlet of the measuring chamber;
   an outlet gate disposed proximate to the outlet of the measuring chamber; and
   wherein the inlet gate and the outlet gate are adapted to be selectively opened and closed to selectively meter an amount of the cleaning agent in the measuring chamber.

10. The device of claim 9 wherein the measuring chamber is adapted to be selectively attached and detached from the dispensing portion.

11. The device of claim 9 further comprising an inner mechanism configured to selectively open or close the inlet gate or the outlet gate.

12. The device of claim 11 further comprising an external mechanism in operable connection with the inner mechanism and configured to receive an input from a user.

13. The device of claim 12 wherein:
the inlet gate and the outlet gate each comprise a sliding gate having a hinge;
a resilient member is operably connected to the external mechanism and to the handle portion and biased to position the external mechanism such that the inlet gate is in a closed position and the outlet gate is in an open position; and
the external mechanism is configured to pivot about a pivot when a lateral force is applied to the external mechanism to move the inlet gate to an open position and simultaneously move the outlet gate to a closed position.

14. The device of claim 12 wherein the external mechanism is a trigger.

15. The device of claim 11 further comprises an electronic controller in operable control of the inner mechanism.

16. The device of claim 11 wherein:
the inlet gate and the outlet gate comprise a disc with an opening;
a gear operably connected to the inner mechanism and the disc; and
the inlet gate and the outlet gate have a closed position wherein the opening is within the handle portion and an open position wherein the opening is axially aligned with the vertically oriented channel, the inlet of the measuring chamber, and the outlet of the measuring chamber.

17. The device of claim 9 wherein the inlet gate opens simultaneously as the outlet gate closes.

18. A method for dispensing a chemical cleaning agent, the method comprising the steps of:
loading the chemical cleaning agent into a storage portion of a dispensing device from a packaging containing the chemical cleaning agent, wherein the storage portion funnels the chemical cleaning agent towards an inlet gate;
activating a mechanism to open an outlet gate and close the inlet gate;
transferring a metered amount of the chemical cleaning agent into a first modular, interchangeable measurement chamber when the inlet gate is open and the outlet gate is closed, said first modular interchangeable measurement chamber having a first inner circumference;
deactivating the mechanism to close the outlet gate and open the inlet gate;
dispensing the chemical cleaning agent from the dispensing device when the outlet gate is open and the inlet gate is closed through a dispensing portion of the dispensing device, the dispensing portion having a vertically oriented handle portion and a vertically oriented channel in selective operable connection with the storage portion; and
selectively interchanging the first measurement chamber for a second measurement chamber having a second inner circumference not equal to the first inner circumference and configured to meter a different metered amount of the chemical cleaning agent.

19. The method of claim 18 wherein the step of loading the chemical cleaning agent into the storage portion further comprises attaching a removable chemical container containing the chemical cleaning agent.

* * * * *